United States Patent [19]

Kloster et al.

[11] 3,959,130

[45] May 25, 1976

[54] PROCESS FOR DECONTAMINATING SEWAGE CONTAINING CYANIDE

[75] Inventors: Heinz Kloster; Gerhard Preusser; Paul Radusch, all of Essen, Germany

[73] Assignee: Heinrich Koppers Gesellschaft mit beschrankter Haftung, Essen, Germany

[22] Filed: July 31, 1974

[21] Appl. No.: 493,461

[30] Foreign Application Priority Data

Aug. 16, 1973  Germany............................ 2341228

[52] U.S. Cl. ................................. 210/37 R; 210/40
[51] Int. Cl.² ......................................... C02B 1/14
[58] Field of Search ................. 210/24, 37, 39, 40, 210/502, 500; 106/DIG. 1

[56] References Cited
UNITED STATES PATENTS

| 2,887,451 | 5/1959 | Hill et al. ............................... 210/40 |
| 3,152,985 | 10/1964 | Stoertz et al. .......................... 210/40 |
| 3,401,114 | 9/1968 | Carlton et al. ......................... 210/40 |
| 3,424,676 | 1/1969 | Johnson et al. ........................ 210/40 |
| 3,650,949 | 3/1972 | Hager et al. ............................ 210/39 |

OTHER PUBLICATIONS

Honda et al., "Activated-Charcoal Treatment of Waste Water Containing Cyanide," Chemical Abstracts, Vol. 69:45870z (1968).

*Primary Examiner*—Charles N. Hart
*Assistant Examiner*—Benoit Castel
*Attorney, Agent, or Firm*—Michael S. Striker

[57] ABSTRACT

Process for decontaminating sewage containing cyanide and possibly also containing hydrogen sulfide which comprises where necessary adjusting the pH of the sewage to be decontaminated to a value of over 7.0 and bringing the sewage into intimate contact with an ash product produced in the gasification and/or combustion of solid fuels.

13 Claims, No Drawings

PROCESS FOR DECONTAMINATING SEWAGE CONTAINING CYANIDE

The present invention relates to a process for decontaminating sewage containing cyanide, and which may also contain hydrogen sulfide.

A number of processes are already known for use in the decontamination of sewage containing cyanide which are based on chemical reaction. In most of these processes, decontamination procedures and techniques are carried out by treatment of the sewage with chlorine or with a compound or compounds containing chlorine, the cyanide ion thereby being first oxidized to the cyanate ion and thereafter being further decomposed to $CO_2$ and $N_2$. It is important to note that even the cyanate ion is considerably less toxic than the cyanide ion. These processes which are indeed simple are, however, like other oxidizing processes relatively expensive due to the requirement for large amounts of oxidizing agent, this being particularly the case when the sewage to be decontaminated contains other oxidizable impurities. The latter processes moreover require constant supervision, in order to be sure that there is not unintentionally discharged any of the highly poisonous cyanide-containing sewage.

It is furthermore known that sewage containing cyanide ions can be decontaminated by procedures involving the treatment of the sewage with iron sulfate or other iron-II-salt solutions, the cyanide and iron thereby being bound as a complex cyanoferrate. However, this type of process also involves a relatively high consumption of chemicals, which can be further increased by the presence of other oxidizable ions in the sewage, as for instance nitrate ions. If the concentration of these additional ions is relatively high by comparison with the cyanide content, the divalent iron is oxidized by the nitrate ions to trivalent iron, which is thereafter precipitated in the alkaline medium as $Fe(OH)_3$. The divalent iron is therefore removed from the cyanide-containing sewage being decontaminated and has to be supplemented by fresh reagent solution. Finally, it has also been proposed to reduce the cyanide content of sewage by distillation separation techniques and/or to feed the sewage containing the cyanide to trickle or cooling columns for separation of the cyanide. Apart from the fact that by such processes only a portion of the cyanide content of the sewage can be removed, a fundamental drawback is associated with this type of process and namely that the decontamination of the sewage is accompanied by a simultaneous contamination of the air with cyanogen compounds, so that in this case there is only accomplished a shifting of the problem but not a fundamental solution.

It is therefore an object of the invention to provide a process for the decontamination of sewage containing cyanide which avoids the drawbacks of the art.

It is another object of the invention to provide a process for the decontamination of sewage containing cyanide which can be carried out with relatively inexpensive reagents.

Still another object of the invention is to provide a process for the decontamination of sewage containing cyanide which is also effective where the sewage additionally contains hydrogen sulfide.

These and other objects and advantages of the invention will become apparent from a consideration of the following disclosure. In accordance with the invention there is provided a process for the decontamination of sewage containing cyanide and which may also contain hydrogen sulfide, which comprises maintaining the sewage to be decontaminated, at a pH value of over 7, in intimate contact with the ash product produced in the gasification (partial oxidation) and/or combustion of solid fuels and after a reaction time of at least 10 minutes separating the sewage from the ash.

The process according to the invention therefore uses as reagent for binding the cyanide ions contained in the sewage, an ash product that is produced as residue during the gasification and/or combustion of solid fuels such as lignite or coal or coal dust, and which has hitherto been regarded as a more or less worthless and troublesome secondary product of such gasification.

In accordance with the invention it has now surprisingly been found that this product of little value can be used in a most simple and economical manner to effect the decontamination of cyanide-containing sewage. It is however a prerequisite for adequate reactivity for the ash to be present in an adequately fine granular form. For this reason the process according to the invention is preferably carried out with flue dust, which product in any event has to be separated from the gases produced in the gasification or combustion procedures. Such flue dust has, for instance, an average grain size of about 19 microns. If for the separation of the flue dust or fly ash from the gas a dry gas scrubbing process, as for instance an electrostatic gas scrubbing has been used, the light ash is recovered in the form of a dust-like material. If, on the other hand, a wet gas purification of the gasification or combustion gas is carried out, wherein for instance, the gas is simultaneously cooled and washed by the direct injection of water, the fly ash is recovered in the form of a sludge or suspension. For carrying out the process according to the invention it is, however, immaterial whether the ash is used in the form of a dust or as a sludge or suspension. The ash must in any case be thoroughly mixed with the sewage being decontaminated so as to form a suspension therewith. If a light ash is not produced in an adequate amount during the gasification and/or combustion, it is of course also possible to use, in addition or instead, the ash which is present at the bottom of the gasifier or combustion chamber, provided that this is available or can be provided in sufficiently fine granular form. In many gasification and combustion processes, the operation is conducted at temperatures which lie above the melting point of the ash with the result that the ash is removed largely as slag from the bottom of the gasifier or combustion chamber. In this case, however, by appropriate grinding of the slag, an ash product is provided having a fine granular and adequately reactive form. The grain size, after grinding, should be less than 25 microns, and preferably less than 15 microns.

The intimate contact between sewage and ash which is essential for the reaction and therewith conversion of the cyanide is preferably brought about by forming a suspension of sewage and ash and stirring the suspension throughout the entire reaction period. However, other mixing and contacting methods can be used, as for instance shaking or ultrasonicinduced vibration.

Naturally, the degree of decontamination of the sewage depends on the reaction time. Exhaustive investigations have shown that with reaction times of less than 10 minutes, it is not as a rule possible to obtain an adequate reduction of the cyanide contend in the sewage. The optimum reaction time is normally in the range of between 30 and 45 minutes. On the other hand, if the reaction time is extended over and beyond the period of 45 minutes it does not as a rule result in there being obtained any further appreciable lowering of the cyanide content of the sewage. If the sewage to be decontaminated at the same time contains hydrogen sulfide in addition to the cyanide it may prove practical to extend the reaction time beyond the period of 45 minutes. In this way, under certain circumstances, a further lowering of the hydrogen sulfide content can be obtained.

Following the expiration of the reaction time the sewage-ash suspension is separated into its constituents.

This is best done by passing the suspension into a sedimentation tank of the usual and known design and construction and by separating the ash as a sludge from the purified sewage by allowing the entire batch to stand in the tank. The sewage which forms the top layer can then be drawn off from the settling tank and removed from the circulation.

It is of course possible to use other methods of separation, as for instance filtration. In practice, however, separation in a settling tank has proved to be the simplest and most economical method of carrying out this step. Exhaustive investigations have established that the reactivity of the ash or the ash sludge is normally not exhausted after but a single use. Indeed, the ash sludge deposited in the settling tank can be brought into contact with a second, and sometimes even with a third and fourth batch of sewage. Examination of these subsequent batches establishes in these cases also that a satisfactory decontamination has taken place. The reaction mechanism that takes place during the decontamination of the sewage by the ash or the ash sludge has not yet been completely defined and established. It must, however, be regarded as established that it is primarily the iron content of the ash which is responsible for the fixing of the cyanide ions of the sewage. The cyanide ions are fixed first of all with the formation of $Fe(CN)_2$. This compound remains as a solid in the ash sludge. Excess cyanide ions can then be caused to react further to form the cyanoferrate complex $Fe(CN)_6^{-4}$. If the sewage to be decontaminated also contains hydrogen sulfide, the formation of iron sulfide and thiocyanate also take place. The iron cyanoferrate and thiocyanate compounds are soluble owing to the alkalinity of the reaction mixture (pH value greater than 7) and are therefore at least in part carried along with the sewage which has been decontaminated. This is quite harmless, however, as these compounds are very much less toxic than hydrogen cyanide and other cyanide compounds, as may be seen from the following table which sets out the limits of toxicity of certain CN compounds:

| Sewage Component | Limit of Toxicity mg/l |
| --- | --- |
| Ammonium rhodanide $NH_4SCN$ [thiocyanate] | 1700 |
| Hydrogen cyanide HCN | 0.05 |
| Cyanogen chloride ClCN | 0.08 |
| Potassium ferrocyanide $K_4Fe(CN)_6$ | 1700 |
| Potassium ferricyanide $K_3Fe(CN)_6$ | 1700 |
| Potassium thiocyanate KSCN | 1700 |

The iron content of the ash which is produced during the gasification of solid fuels is normally in the range of about 5 to 10% by weight Fe. This iron content of course depends on the iron content of the fuel product used in gasification or burning. As a rule, the iron content in the ash suffices to effect the decontamination of the sewage containing cyanide to the desired extent. However, if the sewage still contains a large amount of hydrogen sulfide which fixes iron in the form of FeS, the rare case may occur where the iron content of the ash does not prove adequate. This can easily be remedied, however, either by adding to the ash or the ash sludge iron compounds to the necessary extent or by mixing iron-containing compounds with the fuels to be gasified or burnt before the gasification or combustion operation. Suitable iron compounds for this purpose have been found to be finely ground iron ores and inexpensive iron-II salts, such as $FeSO_4$.

It has already been stated above that for carrying out the process according to the invention, the light ash or fly ash (flue dust) which is produced during gasification and/or combustion is most suitable. To ensure this, care should be taken that during the gasification and/or combustion of the solid fuel, the addition of any chemicals to the fuel, such as are often used for reducing the proportion of light ash, is omitted.

Particularly suitable conditions for carrying out the process according to the invention have been found to be a pH value in excess of 7.0 and preferably in the range of between 8 and 10 and, as has already been pointed out above, a reaction time of at least 10 minutes and preferably of between 30 and 45 minutes.

The invention and its advantages will be illustrated by the following examples, it being understood that the examples are for illustrative purposes only.

EXAMPLE 1

Use was made of an ash sludge which was separated in the conventional manner from a partial oxidation gas obtained by the gasification of coal dust and which, following gasification, was subjected to direct cooling and washing with water. This ash sludge, which contains the particles of light ash in the form of a suspension with the wash water had a solids content of 254 g/l. The average grain size of the ash amounted to 18.91 microns and about 90% of the ash had a grain size in the range of 23–15.5 microns. In the dry substance, an iron content of 6.44% by weight was found. This ash sludge was used for purifying sewage which contained 158 mg/l HCN and 265 mg/l $H_2S$. For this purpose, the sewage to be decontaminated was added in batches to the ash sludge. The quantity of sewage involved was 3 $m^3$ sewage per $m^3$ ash sludge. By the addition of lime, the pH value was adjusted to a value of 9.0 in the sewage-ash suspension. The reaction time amounted in total to 45 minutes. However, after only 10 and 30 minutes the HCN and $H_2S$ contents were ascertained and found to be markedly lowered. During the period of the reaction the sewage-ash suspension was stirred mechanically. The sewage-ash suspension was then introduced into a settling tank of usual design, and the sewage therein separated from the ash sludge. For this sewage, the following values for HCN and $H_2S$ content were established:

| Reaction Time | HCN | $H_2S$ (mg/l) |
| --- | --- | --- |
| 10 minutes | 5.1 | 20 |
| 30 minutes | 1.9 | 10 |
| 45 minutes | 1.1 | 0 |

EXAMPLE 2

The procedure as set out in Example 1 was repeated under substantially the same conditions but with a sewage that displayed a higher HCN and $H_2S$ content. In this case, the values for the starting material were: 305 mg/l HCN and 530 mg/l $H_2S$. After completion of the reaction and analysis, the following values were determined in the sewage drawn off from the settling tank:

| Reaction Time | HCN mg/l | $H_2S$ mg/l |
| --- | --- | --- |
| 10 minutes | 7.3 | 109 |
| 30 minutes | 1.9 | 79.5 |
| 45 minutes | 1.2 | 0 |

The sewage decontaminated in this way can, after suitable dilution, be discharged to the outfall without further treatment.

In the case of smaller contents of HCN i.e., of 5 to 50 mg/l and $H_2S$ contents of for instance 10 to 70 mg/l in the sewage to be decontaminated, after carrying out the process of the invention HCN contents of 0.1 to 0.5 mg/l were obtained and a complete absence of any $H_2S$.

Of course, the size of the sewage charges used in the process can be varied as a function of the HCN and the $H_2S$ contents of the sewage and the solid content of the ash sludge. It is also possible to use larger amounts of sewage per $m^3$ ash sludge, or thinner sludges with a solid content of, for instance, 50 to 100 g/l. However, the artisan will have no difficulty in ascertaining the optimum relations for any run.

It is obvious that the process according to the invention, by comparison with other processes, operates particularly economically, since the ash represents a practically unwanted waste product. The use of the method according to the invention is of course above all suitable for decontaminating process waste liquor, which is produced during the further processing of the gas produced by gasification and/or combustion. Of course, sewage containing cyanide of any other origin may be used.

As used herein, the term sewage means any waste water product irrespective of origin containing therein cyanide and possibly $H_2S$.

What is claimed:

1. A process for the decontamination of sewage which contains cyanide, comprising removing cyanide from sewage containing the same by maintaining said sewage in intimate contact with a fly ash product produced during the gasification and/or combustion of a solid fuel selected from the group consisting of lignite, coal and coal dust at a pH of at least 7 and for a period of at least 10 minutes, said fly ash product comprising particles of a size less than about 25 microns; and thereafter separating said fly ash product and said sewage.

2. Process according to claim 1 wherein said removal is effected batch-wise by bringing batches of said sewage into contact with said fly ash product.

3. Process according to claim 1 wherein said fly ash is obtained by scrubbing the gasification and/or combustion gas produced from said fuel.

4. Process according to claim 3 wherein said fly ash is used in the form of a suspension or sludge.

5. Process according to claim 1 wherein said fly ash product has a grain size of under 15 microns.

6. Process according to claim 1 wherein said fly ash product is re-used in decontaminating additional quantities of sewage subsequent to said separation.

7. Process according to claim 1 wherein said intimate contact is carried out by stirring said sewage and fly ash product.

8. Process according to claim 1 wherein said removal is carried out at a pH of 8 to 10.

9. Process according to claim 1 wherein said removal is carried out for a period of 30 to 45 minutes.

10. Process according to claim 1 wherein said fly ash product comprises iron and a portion and said iron is obtained by the addition to said fly ash product of at least one iron-containing compound.

11. Process according to claim 10 wherein said compound is finely ground iron ore or an iron-II salt.

12. Process according to claim 1 wherein said fly ash product is formed from the slag which has been obtained in the gasification and/or combustion of said fuel and which has been ground to provide a product having a grain size of under 25 microns.

13. Process according to claim 1 wherein said fly ash product comprises iron and a portion of said iron is obtained by the addition of at least one iron-containing compound to said fuel prior to the gasification and/or combustion thereof.

* * * * *